United States Patent
Raisch

(10) Patent No.: US 10,247,254 B2
(45) Date of Patent: Apr. 2, 2019

(54) FRICTION CLUTCH WITH INTERMEDIATE ELEMENT

(71) Applicant: Deere & Company, Moline, IL (US)

(72) Inventor: Stefan Raisch, Vaihingen/Enz (DE)

(73) Assignee: DEERE & COMPANY, Moline, IL (US)

( * ) Notice: Subject to any disclaimer, the term of this patent is extended or adjusted under 35 U.S.C. 154(b) by 20 days.

(21) Appl. No.: 15/442,828

(22) Filed: Feb. 27, 2017

(65) Prior Publication Data

US 2017/0314624 A1   Nov. 2, 2017

(30) Foreign Application Priority Data

Apr. 27, 2016 (DE) .......................... 10 2016 207 196

(51) Int. Cl.
  *F16D 13/52*     (2006.01)
  *F16D 25/0638*   (2006.01)
  (Continued)

(52) U.S. Cl.
  CPC .............. *F16D 13/52* (2013.01); *F16D 13/00* (2013.01); *F16D 25/0638* (2013.01); *F16D 25/10* (2013.01); *F16D 2300/02* (2013.01)

(58) Field of Classification Search
  CPC ................. F16D 13/52; F16D 25/0638; F16D 37/00–37/02; F16D 25/06; F16D 25/00; F16D 25/10
  See application file for complete search history.

(56) References Cited

U.S. PATENT DOCUMENTS 4,989,708 A    2/1991  Gaggermeier
6,206,161 B1 *  3/2001  Ross ................... F16D 25/0638
                                                   192/41 R
(Continued)

FOREIGN PATENT DOCUMENTS

DE     3818239 C1    4/1989
DE     10244523 A1   4/2004
(Continued)

OTHER PUBLICATIONS

German Search Report in foreign counterpart application No. 102016207196.3 dated Aug. 24, 2016 (10 pages).
(Continued)

*Primary Examiner* — Jacob S. Scott
*Assistant Examiner* — Lillian T Nguyen

(57) ABSTRACT

A friction clutch assembly includes a friction clutch having at least two coupling elements coupled to each other and disposed axially movable with respect to each other. Immediately adjacent coupling elements are each assigned to two sides of a power path defined by the coupling of the at least two coupling elements. An intermediate element is provided on which the coupling elements of one side of the power path are held movably in an axial direction of the coupling elements. The intermediate element is switchable between a locked state and a free-running state. An actuator element opens and closes the friction clutch. In a free-running state, a free rotation of the held coupling elements with respect to the assigned side of the power path is permitted, and in a locked state the held coupling elements are blocked from free rotation.

20 Claims, 3 Drawing Sheets

(51) Int. Cl.
*F16D 13/00* (2006.01)
*F16D 25/10* (2006.01)

(56) References Cited

U.S. PATENT DOCUMENTS

| | | | |
|---|---|---|---|
| 7,108,115 B2* | 9/2006 | Ebenhoch | F16D 23/06 192/53.1 |
| 7,204,357 B1* | 4/2007 | Dumas | F16D 25/0638 192/70.12 |
| 2015/0345569 A1* | 12/2015 | Erhard | F16D 13/69 192/70.23 |

FOREIGN PATENT DOCUMENTS

| | | |
|---|---|---|
| DE | 10331370 A1 | 3/2005 |
| EP | 2077398 A1 | 7/2009 |

OTHER PUBLICATIONS

EP Search Report in foreign counterpart application No. 17165551.7 dated Sep. 28, 2017 (6 pages).

\* cited by examiner

FRICTION CLUTCH WITH INTERMEDIATE ELEMENT

RELATED APPLICATIONS

This application claims the benefit of German Application Ser. No. 102016207196.3, filed on Apr. 27, 2016, the disclosure of which is hereby expressly incorporated by reference in its entirety.

FIELD OF THE DISCLOSURE

The present disclosure relates to a clutch, and in particular a friction clutch.

BACKGROUND

Conventional clutches are used in all kinds of drives in which a disconnection of the drive train during operation is envisioned. They can be used in all types of vehicles, as well as in stationary plants that provide disengagement in operation. Clutches of this kind are switchable, so that they can be switched between an engaged and a disengaged state during operation. Such clutches mostly have disk-shaped coupling surfaces, which transmit power between the two sides of the clutch through mutual engagement in engaged or locked state. In the process, one side can be provided with a torque from a drive, while the other side provides for the transmission of the torque to an output. This state is, however, not fixed. Modern transmissions can, according to the gear that is selected, lead to different torques being transmitted via the same clutch, even originating from different sides.

Thus, in each case according to the use of the clutch, a plurality of power paths can be transmitted from a connected transmission via the clutch. Here, even the direction of the power flow can be changed via the clutch, so that an input or an output of the clutch can alternate in each case according to operating state.

In an open or disengaged state, the coupling surfaces or coupling elements are spaced apart by a clearance. In most cases, such clutches are designed as wet clutches and run in a fluid for lubrication and heat dissipation. In order to keep the locking operations during operation brief and also to design the installation dimensions of such clutches to be small, the coupling elements are spaced apart in the disengaged state, but only with a minimal clearance so that a switching can take place rapidly and with low travel.

Conventional coupling elements are in operational connection with the sides of the clutch that are assigned to them even in disengaged state. This causes the coupling element to continue to rotate at the rotary speed of the relevant associated side of the clutch even when the clutch is disengaged. Because of this, in the disengaged state, the coupling elements are at a short spatial distance from each other and rotate in opposite directions. Because of the rotation of the coupling elements in the oil bath of the clutch, shear forces arise due to friction with the fluid. These shear forces cause a drag and thus a power loss of the clutch in the disengaged state if power is applied to at least one side of the clutch. This leads to heating of the liquid and to power losses in the drive. Not only can there be oxidation processes in the oil due to the heating, but there can be an increasing power loss due to which fuel consumption values for the drive rise significantly while at the same time less power is available for operation.

SUMMARY

In one embodiment of the present disclosure, a friction clutch has at least two coupling elements that can be coupled to each other, which are disposed to be axially movable with respect to each other, where immediately adjacent coupling elements are associated with each of the two sides of the power path of the clutch. An intermediate element at which the coupling elements of one side of the power path are held so as to be movable in their axial direction, where the intermediate element can be switched between a locked state and a free-running state. An actuator element is provided for disengaging and engaging the friction clutch, where in a free-running state a free rotation of the held coupling elements with respect to the associated side of the power path is permitted, and in a locked state, the held coupling elements are blocked against free rotation.

Because of the free-running state, the coupling elements of one side can be matched to the rotary speed and direction of rotation of the coupling elements of the other side. Due to this, the resulting drag torque is highly reduced and heating of the oil is likewise reduced, which in turn can eliminate the need for cooling and heat dissipation. The consumption of fuel decreases because of this, since in most cases a plurality of such clutches are provided in a machine, where the majority of the couplings are in a disengaged state during operation, and these couplings have reduced friction.

In a further embodiment, the intermediate element holds the coupling elements at their relevant outer or at their relevant inner circumference. Through this, the intermediate element can be provided on any desired side of the friction clutch. This favors free design of the friction clutch and an advantageous utilization of installation space. Through this, the friction clutch can be optimally designed for a given installation space.

In a further development, the actuator element moves the intermediate element from a free-running state to a locked state.

The friction clutch together with the actuator element and the intermediate element can be designed quite diversely. The actuator element thus acts on the intermediate element. This can take place, among other ways, by shifting, pressing, rotating, sliding, pulling, lifting, or lowering the intermediate element, where the intermediate element is controlled by the actuator element.

In another embodiment, the intermediate element is switched from a free-running state to a locked state in the axial direction.

With the axial switching ability, the intermediate element can be accommodated in the friction clutch in a space-saving way. The axial direction in this case is the axial direction of the coupling elements, so that small spacings from intermediate element to the coupling elements can be realized. The required installation space for the friction clutch is therefore also favorably reduced at the same time.

In a further embodiment, the intermediate element is switched from a free to a locked state by means of a locking synchronization, a jaw clutch, or a selector gear.

The difference between the rotary speeds of the intermediate element and the relevant side of the clutch can be easily matched with the help of the locking synchronization. Through this, wear of components is reduced and there is reduced noise during changes of state.

The jaw clutch allows a space-saving implementation of the possibility of a separable connection between the intermediate element and the relevant side of the clutch. In addition, jaw clutches are well established so that the corresponding components are convenient.

A selector gear enables a uniform power input from or to the intermediate element. At the same time, this leads to a lower stress on the intermediate element and to a longer lifespan. Moreover, a selector gear can be designed with a favorable geometry in the axial or radial direction and allows good matching.

In another embodiment, the actuator element first moves the intermediate element from a free-running state to a locked state and then locks the friction clutch. The actuator element is thus used for two functions. Additional components can be spared through this, and the friction clutch has a lower space requirement. Because of the smaller number of components, the susceptibility to error is also reduced.

In yet a further embodiment, the actuator element is driven hydraulically, electrically, pneumatically, or mechanically. A hydraulically driven actuator element can apply high actuating forces, so that a reliable actuation, both of the intermediate element and also the coupling elements, can be implemented. With an electrically driven actuator element, one can realize a simple design that does not need to have expensive liquid seals, does not need feeder ducts and valves, as would be necessary with hydraulic controls, and can be centrally supplied with power. In the case of a pneumatic actuator element, the design likewise can be kept simple. Through the design, the weight can be reduced and heat is no longer introduced, as is the case with electric drives, for instance, so that overall a lower heat input takes place. Through a mechanically driven actuator element, a precise travel can be guaranteed and good controllability achieved.

In another design, the intermediate element is switched from a free-running to a locked state independent of an actuator element. The intermediate element can thus be controlled independent of the actuator element. Through this, different actuating forces can be realized for the relevant control, for instance greater forces for locking the friction clutch and smaller forces for actuation of the actuator element. Thus, optimization of the actuating time and switching forces is possible. This can lead to an improvement of wear and to a balanced, weight-optimized component layout.

In one embodiment, the friction clutch is a wet or dry running single disk clutch or lamellar clutch. Higher powers can be transmitted via a wet running clutch, so that a more compact design of the friction clutch for a given power is possible. A dry running clutch enables a savings of weight, since the lubricant is omitted and oil pumps or an oil cooler are also not necessary.

In another development, the actuator element can be a piston, a disk, a plunger, or a spring. Costs can be reduced through the use of such standardized components. The piston can be used especially advantageously when the actuator element is actuated by hydraulic or pneumatic drives. The design as a disk can result in a simple construction, for instance for mechanical actuation. If a spring is used, the construction can have a low weight and act on the actuator element through an additional triggering mechanism in order to realize brief actuation times.

In one embodiment, the actuator element is reset in the axial direction by a spring. With the use of a spring, in the form of a plate spring or the like, the actuator element can be reset while avoiding a complicated mechanism. Thus, the actuator element operates against the spring forces and can also return to the initial position if there is a loss of power.

In one design, the friction clutch has at least one carrier for movably holding the coupling elements of one side of the power path, where the carrier blocks a rotation of the coupling elements about their axis, even in the engaged state. The coupling elements cannot rotate in the engaged state so that the power is transmitted from one side of the friction clutch to the housing and converted to heat. Through the braking function, the friction clutch can also be used to decelerate rotary torque. It is also possible, through additional locking elements, to make available a friction clutch that can be used on the one hand as a clutch and on the other as a brake.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
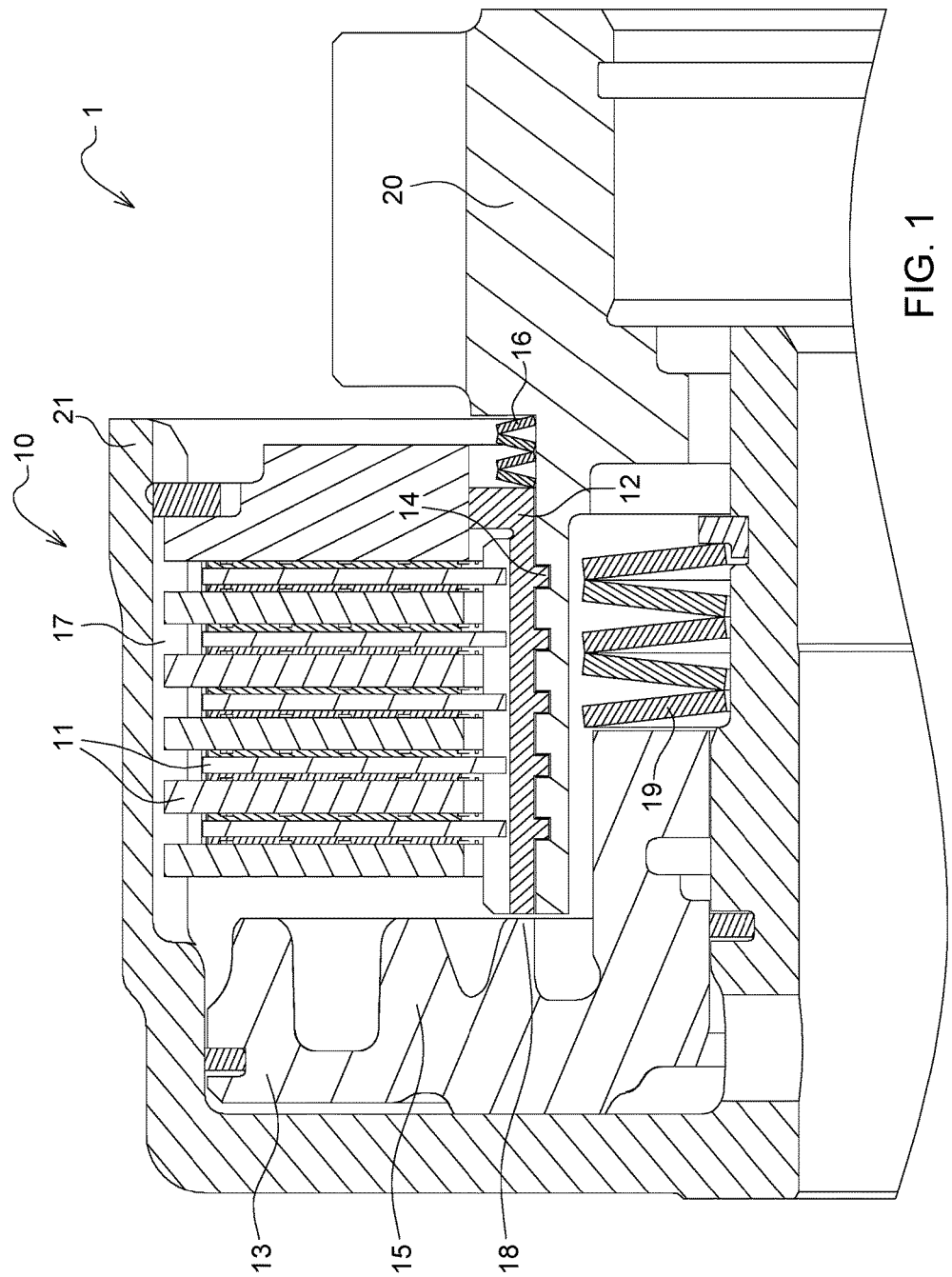
FIG. 1 is a schematic of a first embodiment with a movable intermediate element at an inner circumference of the coupling elements.

In FIG. 1, a friction clutch 10 is shown. The friction clutch 10 has a plurality of lamellae 11 in the form of coupling elements 11. The lamellae 11 are disposed between an outer 21 and an inner 20 connection in the friction clutch 10.

The two connecting elements 20, 21 represent the connection of the friction clutch 10 to the drive train. The lamellae 11 are held in the corresponding holders 17 movably along their axial direction with respect to the connecting elements 20, 21, so that by a shift in the axial direction they are brought up to each other in the system or are opened, so that a clearance is present.

In the closed state, a power is transmitted from one of the connecting elements 20, 21 to the other, by utilizing the friction closure of the lamellae 11 for transmission. The lamellae 11 are each alternatingly assigned to one of the closures 20, 21. The closures 20, 21 are each assigned to different sides of the power branch of the friction clutch 10.

A stop is provided in an axial direction of the coupling elements 11, and an actuator element 13 is provided on the axially opposite side of the coupling elements 11. The actuator element 13 can, for example, be a piston 15, which is supplied with pressure by a medium through a back-side actuator space lying opposite the coupling elements 11, so that it is axially pressed against the packet of coupling elements 11. The actuator element 13 is assigned to a connecting element 20, 21.

The actuator element 13 can be loaded with a force by a spring packet 19, which resets the actuator element 13 to the starting position if actuation of the coupling 1 is not taking place.

In FIG. 1, an intermediate element 12 is provided on the inner circumference of the coupling elements 11. The intermediate element 12 is mounted axially slidable in the direction of the coupling elements 11. In the position shown, the intermediate element 12 is shown with a selector gear 14 in free run. Through the free-running position of the selector gear 14, the intermediate element 12 can rotate freely relative to the connecting element 20. The coupling elements 11, which are held on intermediate element 12, are thus likewise freely rotatable. Thus, the intermediate element 12 is in free-running state. The free-running state of the intermediate element 12 is characterized in that a free spacing to the connecting element 20 is present. The axial spacing in this case can be set by a spring element 16 in the free-running state.

The coupling elements 11 have a clearance from each other so that they do not contact one another. The space around the coupling elements 11 is filled with oil. In normal operation, a connecting element 20, 21 is in rotation even if the coupling 1 is uncoupled. Through this, the coupling elements 11 of said connecting element 20, 21 rotate at the same speed. In the embodiment shown, this can be the connecting elements 21. Thus, the coupling elements 11 of connecting element 21 rotate together. The coupling elements 11 of connecting element 20, however, are not connected through the free-running state of the intermediate element 12.

A power transmission takes place, via the oil in the coupler space, from the rotating connecting element 21 to the oil through the coupling elements 11. This results in said shear torque also being transmitted to the freely rotatable coupling elements 11 of connecting element 20 and matching their rotary speed. A loss of torque through the opposing directions of rotation of the coupling elements is avoided.

The intermediate element 12 is switched from the free-running state to the locked state by the application of an axial force in the direction of the spring 16 of the intermediate element 12 by the actuator element 13. This takes place through the actuator surface 18, which is applied to a first edge of the actuator element 13. Through this, the intermediate element 12 is pressed against the connecting element 20 of the power branch, so that the free-running state is ended and the intermediate element is connected nonrotatably to the connecting element 20, via the selector gear, which is situated between the intermediate element 12 and the connecting element 20. Through this connection, the coupling elements 11 of the intermediate element 12 are now likewise connected nonrotatably to connecting element 20.

The actuator element 13 has pressure surfaces that exert pressure on the coupling elements 11 during the axial shifting and so close the coupling. Thus, through the axial shift of the actuator element 13, first, the axial shift of the intermediate element 12 takes place, and then the closing of the friction clutch 10 so that power can be transmitted from one connection to the other. This can take place via a matched geometry of the actuator element 13. Thus, the actuator surface 18 can protrude farther in the axial direction than the pressure surfaces of the actuator element 13, which close the coupling.

The opening operation of the coupling takes place in the reverse order. Then the coupling elements 11 in the completely opened coupling again have a clearance with respect to each other and the intermediate element 12 is in free-running state.

Figure 2:
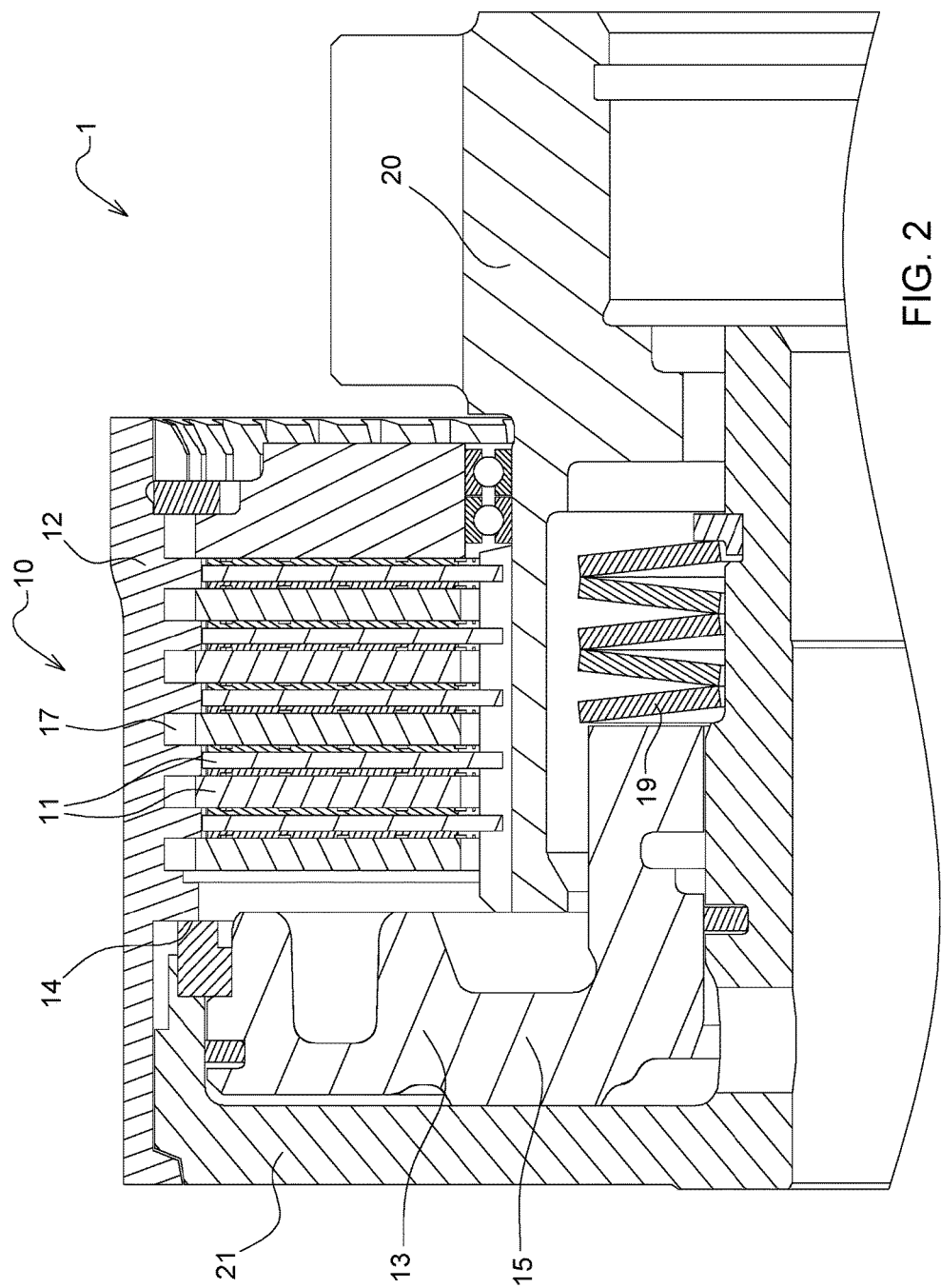
FIG. 2 is a schematic of a second embodiment with a movable intermediate element at an outer circumference of the coupling elements.

In FIG. 2, equivalent components are marked with the same reference number.

The intermediate element 12 is attached to one side of the clutch 1 at connecting element 21. The intermediate element 12 can, in this case, rotate in free-running state relative to connecting element 21. At intermediate element 12, the coupling elements 11 are disposed so that they can slide in the axial direction alternatingly with the coupling elements of the connecting element 20.

A segment with a selector gear 14 is provided at piston 15. The intermediate element 12 cannot slide axially, but it is mounted rotatably. At a stop, the intermediate element 12 likewise has a complementary selector gear, which is designed for engagement with the selector gear 14 and in free-running state has an axial spacing from it.

By sliding the piston 15 in the axial direction, the selector gear 14 is brought into engagement so that the intermediate element 12 is locked to the connecting element 21 and is nonrotatably connected to it. If the piston 15 is shifted axially farther, the coupling elements 11 become pressed to each other and the friction clutch 10 becomes closed. To open the coupling, the steps run in the reverse sequence.

Figure 3:
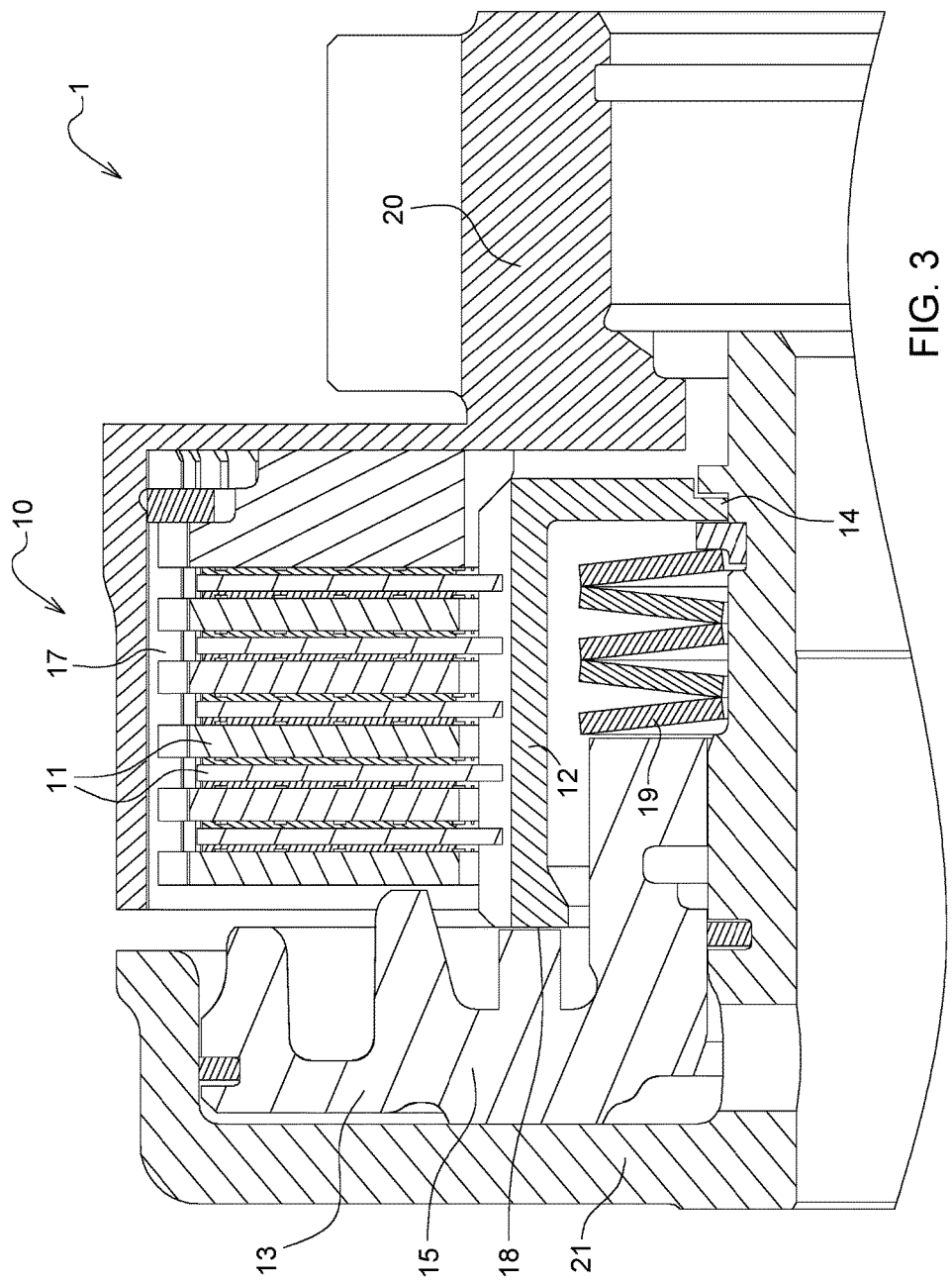
FIG. 3 is a schematic of a third embodiment with a movable intermediate element at an inner circumference of the coupling elements in another alternative design.

In FIG. 3, equivalent components are marked with the same reference numbers.

This figure shows an alternative design to FIG. 1. The intermediate element 12 has a radial segment, on the outer end of which in the axial direction there is a selector gear 14. In the free-running state, there is an axial gap between the selector gear 14 and the connecting element 21, so that the intermediate element can be rotated independently from connecting element 21. Through the axial shift of piston 15, the intermediate element 12 is pressed axially in the direction of connecting element 21 by the actuator surface 18, so that the selector gear 14 comes into engagement with the connecting element 21 and becomes nonrotatably connected to it. The intermediate element is then in a locked state. With a further axial shift of the actuator element 13, the coupling elements 11 are then pressed together, so that the coupling becomes closed. In opening the coupling, the steps take place in the reverse order.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A friction clutch assembly, comprising:
   a friction clutch including at least one first coupling element coupled to at least one second coupling element and disposed axially movable with respect to each other, where immediately adjacent coupling elements of the at least one first coupling element and the at least one second coupling element are each assigned to two sides of a power path defined by a coupling of the at least one first coupling element and the at least one second coupling element;
   an intermediate element on which the at least one first coupling element of one side of the power path is held movably in an axial direction of the at least one first coupling element and the at least one second coupling element, where the intermediate element is switchable between a locked state and a free-running state; and
   an actuator element for opening and closing the friction clutch, where in a free-running state a free rotation of the at least one first coupling element with respect to the assigned side of the power path is permitted such that the at least one first coupling element and the at least one second coupling element are configured to rotate at the same speed in the free-running state, and in a locked state the at least one first coupling element is blocked from free rotation such that the at least one second coupling element rotates relative to the at least one first coupling element in the locked state.

2. The friction clutch assembly of claim 1, wherein the intermediate element holds the at least one first coupling element and the at least one second coupling element at their relevant outer or relevant inner circumference.

3. The friction clutch assembly of claim 1, wherein the actuator element moves the intermediate element from the free-running state to the locked state.

4. The friction clutch assembly of claim 1, wherein the intermediate element is transferred in the axial direction from the free-running state to the locked state.

5. The friction clutch assembly of claim 1, wherein the intermediate element is switched from the free-running state to the locked state by means of a locking synchronization, a jaw clutch, or a selector gear.

6. The friction clutch assembly of claim 1, wherein the actuator element initially moves the intermediate element from the free-running state to the locked state by axial movement before closing the friction clutch.

7. The friction clutch assembly of claim 1, wherein the actuator element is operably driven hydraulically, electrically, pneumatically, or mechanically.

8. The friction clutch assembly of claim 1, wherein the intermediate element is transferred from the free-running state to the locked state independent of the actuator element.

9. The friction clutch assembly of claim 1, wherein the friction clutch comprises a wet-running or dry-running single-disk coupling or lamellar coupling.

10. The friction clutch assembly of claim 1, wherein the actuator element is operably reset in the axial direction by a spring.

11. The friction clutch assembly of claim 1, wherein the friction clutch comprises at least one carrier for movably holding the at least one first coupling element and the at least one second coupling element on one side of the power path, the carrier operably blocking rotation of the at least one first coupling element and the at least one second coupling element about their axis in a coupled state.

12. A friction clutch assembly comprising:
   a first connecting element at a first side of the friction clutch assembly;
   a second connecting element at a second side of the friction clutch assembly;
   an intermediate element
      fixed for rotation with one of the first connecting element and the second connecting element in an engaged state, and
      freely rotatable relative to the one of the first connecting element and the second connecting element in a disengaged state such that the intermediate element is fixed for rotation with the other of the first connecting element and the second connecting element in the disengaged state; and
   an actuator element configured to move the intermediate element from the engaged state to the disengaged state.

13. The assembly of claim 12, further comprising:
   at least one first coupling element coupled to the first connecting element; and
   at least one second coupling element coupled to the intermediate element such that the at least one second coupling element and the intermediate element are disposed axially movable with respect to the at least one first coupling element to form a friction clutch.

14. The assembly of claim 13, wherein the at least one second coupling element is coupled to the intermediate element at one of an outer circumference of the at least one second coupling element and an inner circumference of the at least one second coupling element.

15. The assembly of claim 13, wherein the actuator element initially moves the intermediate element from the disengaged state to the engaged state by axial movement before closing the friction clutch.

16. The assembly of claim 13, wherein the friction clutch comprises one of a wet-running single-disk coupling, wet-running lamellar coupling, dry-running single-disk coupling, and dry-running lamellar coupling.

17. The assembly of claim 12, wherein the intermediate element is configured to switch from the disengaged state to the engaged state with one of a locking synchronization, a jaw clutch, and a selector gear.

18. The assembly of claim 12, wherein the actuator element is operably driven one of hydraulically, electrically, pneumatically, and mechanically.

19. The assembly of claim 12, wherein the actuator element is operably reset in the axial direction by a spring.

20. A friction clutch assembly comprising:
   a first connecting element at a first side of the friction clutch assembly;
   at least one first coupling element coupled to the first connecting element;
   a second connecting element at a second side of the friction clutch assembly;
   an intermediate element;
   at least one second coupling element coupled to the intermediate element such that the at least one second coupling element is disposed axially movable with respect to the at least one first coupling element to form a friction clutch, wherein the intermediate element is fixed for rotation with one of the first connecting element and the second connecting element in an engaged state, and the intermediate element is freely rotatable relative to the one of the first connecting element and the second connecting element in a disengaged state such that the intermediate element is fixed for rotation with the other of the first connecting element and the second connecting element in the disengaged state; and
   an actuator element configured to close the friction clutch, wherein the intermediate element is transferred from the disengaged state to the engaged state independent of the actuator element.

* * * * *